Dec. 29, 1931.  G. D. HIGMAN  1,838,308
INTERNAL COMBUSTION ENGINE
Filed Aug. 19, 1929   4 Sheets-Sheet 1
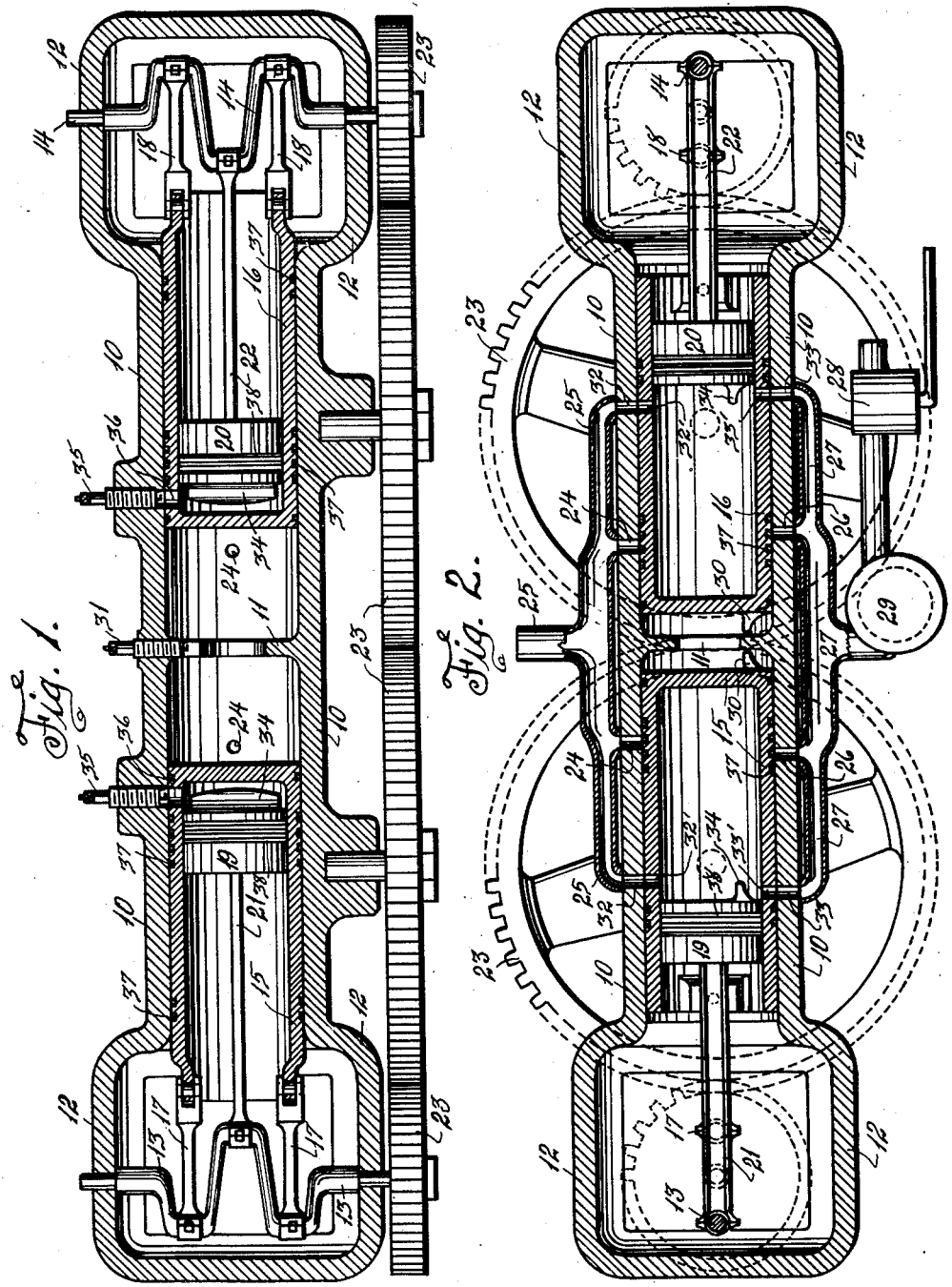
Inventor:
George D. Higman.
By Homer J. Sweet
Attorney.

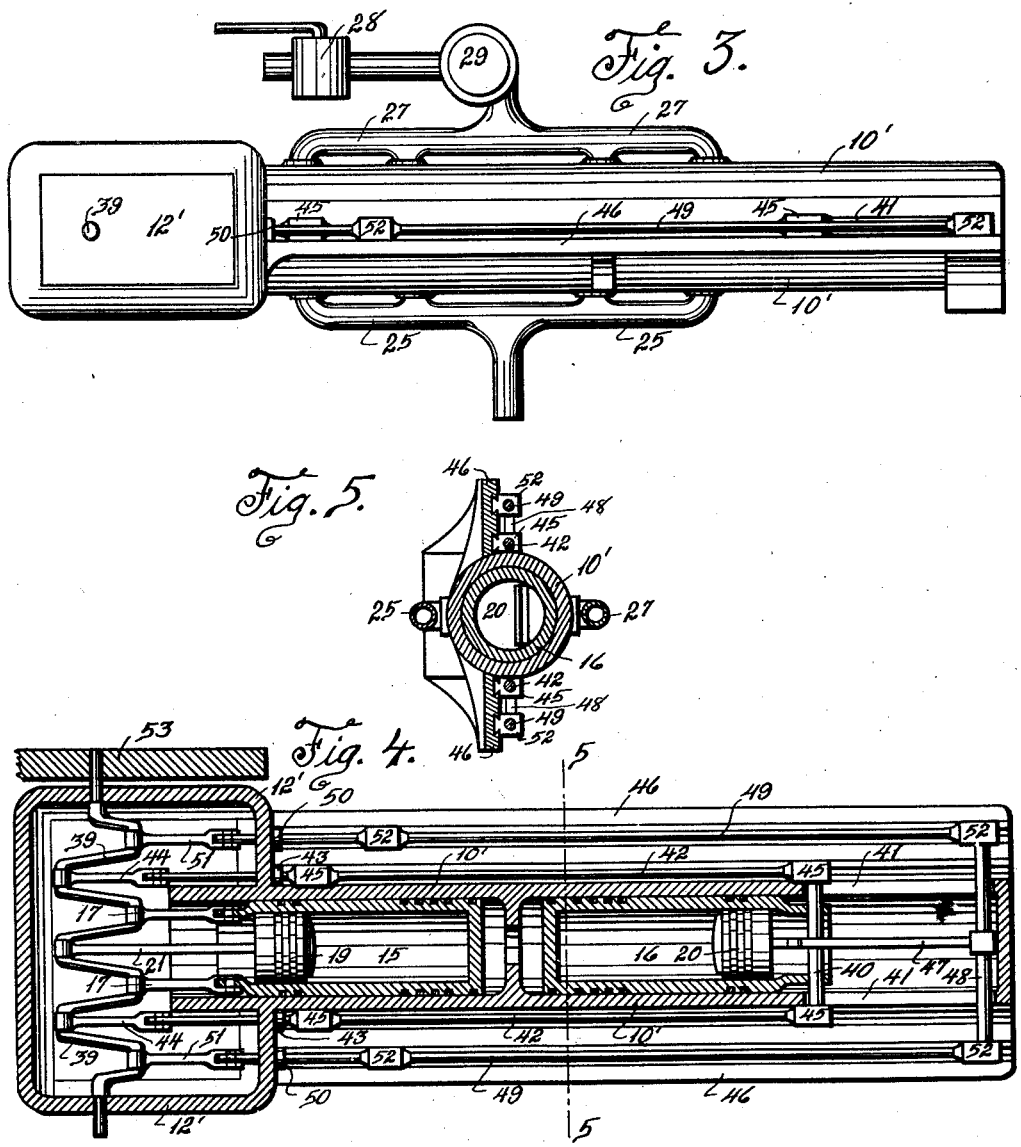

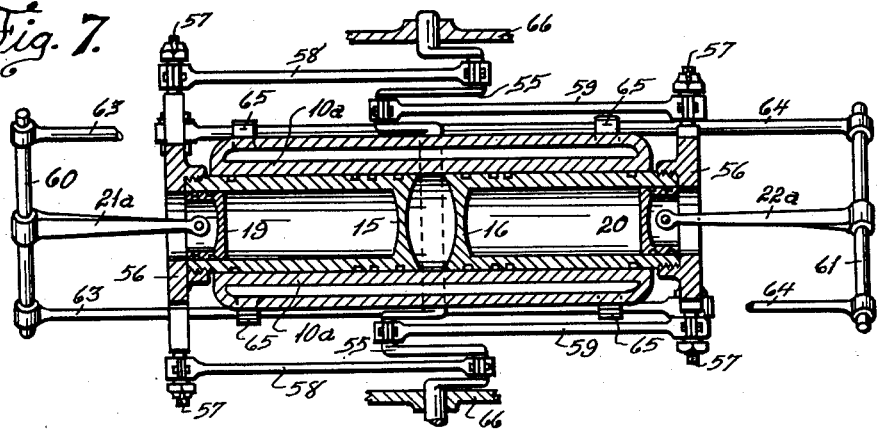
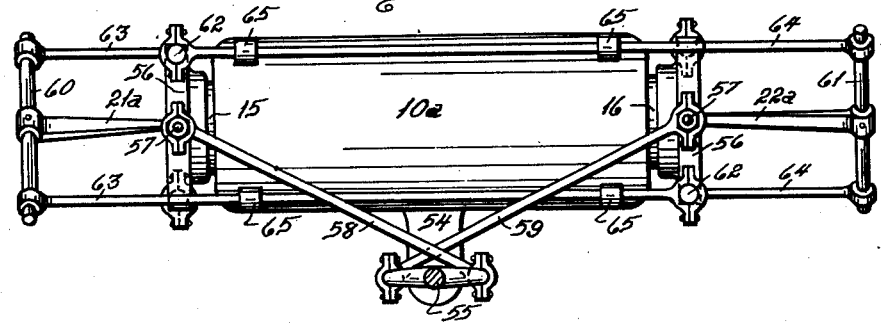
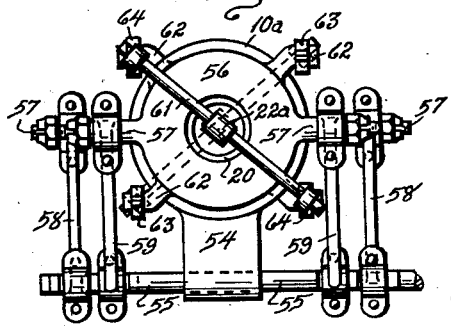

Dec. 29, 1931.  G. D. HIGMAN  1,838,308
INTERNAL COMBUSTION ENGINE
Filed Aug. 19, 1929   4 Sheets-Sheet 4
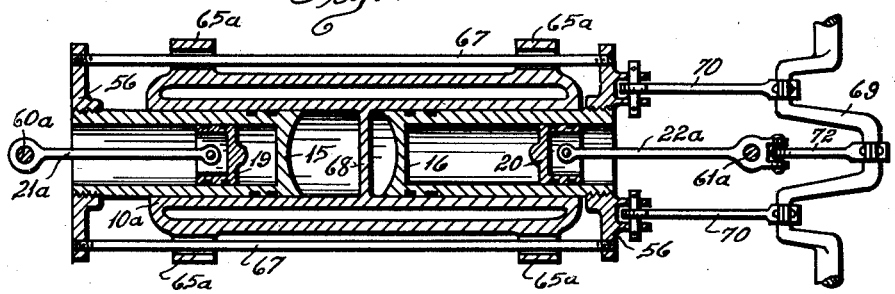
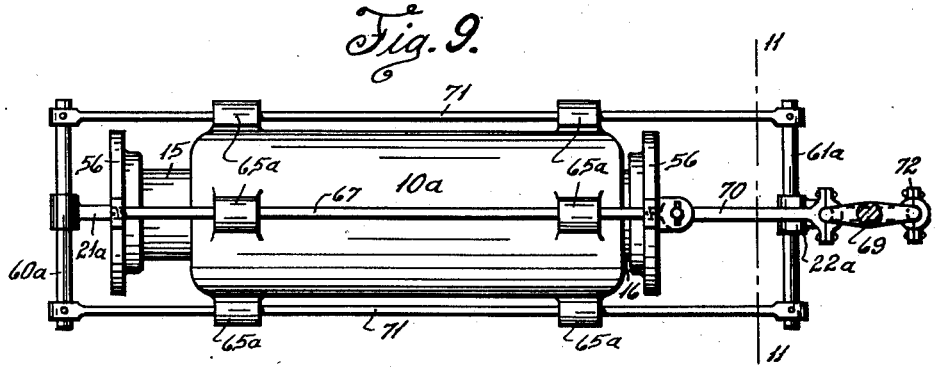
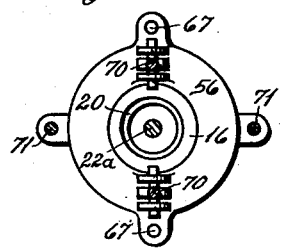
Inventor:
George D. Higman.
By Homer J. Sweet
Attorney.

Patented Dec. 29, 1931

1,838,308

UNITED STATES PATENT OFFICE

GEORGE D. HIGMAN, OF HILLTOP, COLORADO

INTERNAL-COMBUSTION ENGINE

Application filed August 19, 1929. Serial No. 386,801.

An object of this invention is to provide an improved internal-combustion engine.

A further object of the invention is to provide an improved construction and arrangement of pistons in an internal-combustion engine.

A further object of the invention is to provide an internal-combustion engine having a single cylinder and a plurality of pistons operable in said cylinder for multiple-cylinder effect.

A further object of the invention is to provide an improved arrangement of opposed pistons in a single-cylinder internal-combustion engine.

A further object of the invention is to provide an improved arrangement of cooperating pistons in an internal-combustion engine.

A further object of the invention is to provide an improved construction and arrangement of the essential elements of an internal-combustion engine whereby multiple-cylinder effect may be had in a single cylinder.

A further object of the invention is to provide an improved construction and arrangement of the essential elements of an internal-combustion engine whereby maximum power effect may be derived from the initial combustion of the fuel charges.

A further object of the invention is to provide improved means for interconnecting the essential elements of an internal-combustion engine of the type described.

A further object of the invention is to provide improved means for synchronizing and connecting opposed pistons in an internal-combustion engine of the type described.

A further object of the invention is to provide an improved internal-combustion engine of relatively small size for its power, compact form and maximum efficiency.

Further objects and advantages of the invention will appear from the description of the construction and operation of the engine hereinafter set forth.

My invention consists in the construction, arrangement and combination of elements hereinafter set forth, pointed out in my claims and illustrated by the accompanying drawings, in which—

Figure 1 is a longitudinal section axially of the cylinder employed in one form of the invention. Figure 2 is a longitudinal section of the construction shown in Figure 1 on a plane at right angles to the showing of the former figure and with the reciprocating elements of the engine at the opposite limit of their range of movement. Figure 3 is a side elevation of a modified form of the invention. Figure 4 is a longitudinal, axial section of the construction shown in Figure 3. Figure 5 is a cross section on the indicated line 5—5 of Figure 4. Figure 6 is a side elevation of a further modified form of the invention. Figure 7 is a longitudinal, axial section of and at right angles to the showing of Figure 6. Figure 8 is an end elevation of the modification according to Figures 6 and 7. Figure 9 is a side elevation of yet another modification of the invention. Figure 10 is a longitudinal, axial section of and at right angles to the showing of Figure 9. Figure 11 is an end view of the construction according to Figures 9 and 10, partly in section, on the indicated line 11—11 of Figure 9.

In the construction of the improved engine as shown in Figures 1 and 2 of the drawings, the numeral 10 designates a relatively long, open-ended cylinder, formed in any desired manner and of any suitable material with a smooth, uniform bore and provided with an apertured partition or annulus 11 midway of its ends and interrupting said bore. The cylinder 10 terminates at each end in enlarged housings 12 formed on or attached to said cylinder in any suitable manner and three-throw crankshafts 13 and 14 are mounted for rotation transversely of the housings 12 and in spaced, parallel relation perpendicular to the cylinder axis. Similar, relatively long pistons 15 and 16, each of a size to be received in the bore of the cylinder 10 and each formed with a smooth internal bore, are mounted for axial reciprocation in the cylinder 10 on oposite sides of the annulus 11 with their heads in opposition adjacent said annulus and their open ends communicating with the interiors of the housings 12, connecting rods 17 and 18, arranged in pairs, linking the open ends of the pistons 15 and 16 with the alined outer throws of the shafts 13 and 14, respectively, said rods 17 and 18 being of a length to position the heads of the pistons in close proximity to the annulus 11 when the alined throws of said shafts most closely approach the ends of the cylinder 10, as shown in Figure 2. Similar, relatively short pistons 19 and 20, each of a size to be received within the bores of the pistons 15 and 16, are mounted for axial reciprocation within said pistons 15 and 16, respectively, and are linked by means of connecting rods 21 and 22 to the center throws of the shafts 13 and 14, said center throws being offset one hundred and eighty degrees from the alined throws of said shafts, as is clearly shown in Figure 1. The length of the connecting rods 21 and 22 is such as to position the heads of the pistons 19 and 20 in close proximity with the heads of the pistons 15 and 16, respectively, when the center throws of the shafts 13 and 14 most closely approach the ends of the cylinder 10, which condition is shown in Figure 1. Since the two similar halves of the engine are designed to cooperate for unitary action, means must be provided for interconnecting and synchronizing the two shafts 13 and 14, and any suitable means may be employed for this purpose, a gear train 23 being illustrated as one such means in Figures 1 and 2, which gear arrangement permits power take-off from either of the shafts 13 or 14 or from any one of the gears in the train, it being necessary, whatever interconnecting means be employed between the shafts 13 and 14, that the throws of said shafts be positioned in opposed relation, as shown in said figures.

Though my improved engine may be provided with suitable valves and operated on the four-cycle principle, it is shown and will be described as arranged for two-cycle operation, the latter being mechanically simpler and having certain advantages. As shown, ports 24, suitably connected with an exhaust manifold 25, are formed in the cylinder 10 in position to be uncovered by the pistons 15 and 16 as said pistons separate and move outwardly of said cylinder, said ports 24 being adjacent, but spaced inwardly somewhat from, the outer limit of the movement of said pistons, and similar ports 26 are formed in the wall of the cylinder 10 opposite to the ports 24 and closely adjacent the outer limit of the movement of said pistons, so that the ports 26 remain uncovered a less time than do the ports 24, said ports 26 communicating with a fuel manifold 27 to which the proper fuel mixture is delivered, under pressure, from a carburetor 28 through and by means of a fuel pump or supercharger 29. Baffles 30 are formed on the heads of the pistons 15 and 16 in position to mask the ports 26 when said ports are uncovered by the pistons, so that, said ports 26 being uncovered, the pistons being in the position shown in Figure 1, the fuel under pressure in the manifold 27 is discharged through said ports 26 against the baffles 30 and directed against the annulus 11 which diverts the incoming fuel across the cylinder 10 and toward the ports 24, which are likewise uncovered, the incoming fuel forcing the burned gases in the cylinder before it and out through said latter ports and the manifold 25, until the inward movement of the pistons 15 and 16 closes said ports, leaving a charge of fuel within the said cylinder between the heads of said pistons. As the pistons 15 and 16 move inwardly the fuel charge between them is compressed and said compressed charge is fired at approximately maximum compression by means of an igniting device 31 extending within the cylinder and connected, operated and timed in a common manner, the resulting expansion of the burning fuel charge forcing said pistons apart and rotating the shafts 13 and 14 until the ports 24 and 26 are again uncovered, when the cycle is repeated. The manifolds 25 and 27 are extended beyond the ports 24 and 26, as shown in Figure 2, to provide intake and exhaust leads to ports 32 and 33 through the cylinder 10 in the same relation with the pistons 19 and 20 as the ports 24 and 26 bear to the pistons 15 and 16, said ports 32 and 33 being covered by the skirts of the pistons 15 and 16 save when said pistons are at the innermost limits of their travel and the pistons 19 and 20 at the outermost limits of their travel, at which time ports 32' and 33' formed in the skirts of the pistons 15 and 16 register with the ports 32 and 33 to provide continuous conduits for the passage of fuel and burned gases to and from the combustion chambers between the pistons 19 and 20 and the heads of the pistons 15 and 16, respectively, baffles 34 being formed on the heads of the pistons 19 and 20 to direct the incoming fuel in the same manner as do the baffles 30. The cycle of operation of the pistons 19 and 20 is exactly the same as, and opposite to, that of the pistons 15 and 16, and igniting devices 35, similar to the igniting device 31, are positioned in the cylinder 10 to be uncovered by ports 36 in the pistons 15 and 16 when the maximum compression of the fuel charge within said pistons is reached, said igniting devices 35 being timed to fire the compressed fuel charge through said ports 36. Sealing rings 37 are suitably positioned in the pistons 15 and 16 in sliding engagement with the bore of the cylinder 10 to prevent leakage along the outer walls of said pistons and to properly seal the ports in said pistons against undue leakage, and, in like manner and for a like purpose, sealing rings 38 are provided on and for the pistons 19 and 20. The engine above described may be cooled in any desired manner, either by air or liquid, and the various moving parts may be lubricated by means of any desired system, such refinements not constituting a part of this invention.

In the modification according to Figures 3, 4 and 5, the engine is essentially and in principle the same as that heretofore described, the only difference being that the pistons are all operatively connected with a single crankshaft as hereinafter described. The cylinder 10 is replaced by a cylinder 10' having one housing 12' wherein a crankshaft 39 is journaled for rotation perpendicular to the axis of said cylinder. The shaft 39 is provided with seven throws arranged alternately, four of said throws having their pins in axial alinement and positioned one hundred and eighty degrees from the axially-alined pins of the other three throws. Pistons 15, 16, 19 and 20 are mounted in the cylinder 10' in the same manner and relation as above described, the pistons 15 and 19 being connected to the three center throws of the shaft 39 by means of connecting rods 17 and 21, as previously described. A pin 40 is fixed to the outer end of the piston 16 and extends transversely thereof perpendicular to the axis of the cylinder 10', said pin projecting at each end beyond said piston and through longitudinal slots 41 formed in the cylinder 10'. Pull-rods 42 are fixed to each end of the pin 40 outside the cylinder 10' and extend along opposite sides of said cylinder in parallel relation with the cylinder axis and through glands 43 in the housing 12' to the interior of said housing where connecting rods 44 link the ends of the rods 42 with the throws of the shaft 39 in alinement with the center throw of said shaft to which the piston 19 is connected, slides 45 on said rods 42 engaging with guides formed in laterally-extending webs 46 of said cylinder to suitably position and guide said rods.

A link 47 is fixed to the piston 20 and extends outwardly therefrom in embracing relation with the pin 40 to support a laterally-extending pin 48 similar to and in spaced, parallel relation with the said pin 40, said pin 48 extending through the slots 41 and beyond the ends of said pin 40 to a connection at each end with pull-rods 49 similar to and in spaced, parallel relation with the pull-rods 42 on opposite sides of the cylinder 10', said pull-rods 49 extending through glands 50 in the housing 12' to the interior of said housing where they are linked by means of rods 51 to the outermost of the throws on the shaft 39, said throws being in axial alinement with the throws to which the piston 15 is connected, slides 52 similar to the slides 45 and engaging in guides in the webs 46 being provided to position and guide the pull-rods 49. A flywheel, belt pulley or other power take-off may be fixed to one end of the shaft 39, as indicated at 53. With the above described arrangement of elements, the valve ports and igniting devices being the same as formerly described, it is obvious that the functional relation of the elements is the same as that above set forth and that the engine will operate in the manner set forth to rotate the shaft 39, all power impulses effecting the pistons of the engine being transmitted directly to said shaft.

In the modification of the invention according to the showing of Figures 6, 7 and 8, the arrangement of the pistons 15, 16, 19 and 20 within the cylinder and their operation relative to said cylinder is the same as that heretofore described, the only variation from the foregoing construction being in the location of the crankshaft and in the manner of interconnecting the said pistons and operatively connecting them with the crankshaft. As shown in Figures 6, 7 and 8, a cylinder 10a is provided similar to the cylinders 10 and 10' previously described, the cylinder 10a having no housings on its ends for the support of crankshafts and being illustrated as formed with a jacket for water-cooling of the engine. A bracket 54 is formed on or secured to one side of the cylinder 10a midway of the ends of said cylinder and a crankshaft 55 is suitably journaled for rotation in said bracket offset from and axially perpendicular to the cylinder axis, the ends of said shaft 55 projecting beyond the projected walls of the cylinder 10a and each end of said shaft being formed with a pair of crank throws, the pins in each pair of throws being axially parallel and offset one hundred and eighty degrees from each other, so that similar throws having their pins in axial alinement are positioned on opposite sides of the cylinder 10a and in corresponding relation with said cylinder, the inner throws having their pins in alinement and the outer throws being likewise alined, as is clearly shown in Figure 7. The pistons 15 and 16 are mounted for axial reciprocation within the bore of the cylinder 10a in the same manner and relation heretofore described, the open outer ends of said pistons projecting at all times beyond their respective ends of said cylinder, the open ends of said pistons without said cylinder being provided with collars 56 from which extend axially alined pins 57 perpendicular to the axis of said cylinder and in parallel, spaced relation with the crankshaft 55. The pins 57 of the piston 15 extend in opposite directions from said piston and across the arc of travel of the outer throws of the shaft 55, to which throws said pins 57 are operatively connected by means of connecting rods 58. In like manner, the pins 57 of the piston 16 extend across the arc of travel of the inner throws of the shaft 55 and are operatively connected with said throws by means of connecting rods 59 similar to the rods 58, the rods 59 being closer to the cylinder 10a than are the rods 58. Thus is the rectilinear motion of the pistons 15 and 16 applied to the shaft 55, rotating said shaft. The pistons 19 and 20 are mounted within the pistons 15 and 16, respectively, in the relation and manner above set forth, said pistons 19 and 20 being provided with connecting rods 21a and 22a extending axially of the cylinder 10a from said pistons through the collars 56 of the pistons 15 and 16. Cross-arms 60 and 61 are fixed to the outer ends of the rods 21a and 22a, respectively, in perpendicular relation with the cylinder axis and in substantially perpendicular relation with one another, each of said arms 60 and 61 forming an angle with the axis of the more nearly adjacent set of alined pins 57 and each of said arms extending beyond the projection of the walls of said cylinder. Stub shafts 62 are formed on the collars 56 in alinement with the projecting ends of the arm 60 or 61 at the opposite end of the cylinder, and the said ends of the arm 60 are directly connected by means of pull-rods 63 with the stub shafts 62 on the collar 56 carried by the piston 16 while the ends of the arm 61 are similarly connected by means of pull rods 64 with the stub shafts 62 on the collar 56 carried by the piston 15, thus locking the piston 19 to and with the piston 16 and the piston 20 to and with the piston 15, so that each pair of interconnected pistons move simultaneously and in the same direction, though in opposite ends of the cylinder, and each pair of interconnected pistons is directly connected with the shaft 55 by a single set of connecting rods. Slide bearings for the rods 63 and 64 are indicated at 65 as formed directly on the cylinder 10a, though of course any equivalent construction of bearings to support and guide the said rods may be employed. Suitable supports may be provided for the outer ends of the shaft 55, as indicated at 66 in Figure 7, and any desired power takeoff may be connected with said shaft to utilize the power developed by the improved engine. The same system of ports, manifolds and igniting devices may be employed in the modification just described as have been set forth in detail for the previously described forms of the engine, or other fuel and ignition systems operable on either the two or four cycle principle may of course be adapted to the specific form of the engine as set forth.

In the modification according to Figures 9, 10 and 11, the construction is similar to that shown in Figures 6, 7 and 8, save that, the pistons 15 and 16 are directly connected together for simultaneous operation in the same direction by means of pull-rods 67 connecting corresponding points on the collars 56 carried by said pistons. This arrangement of course necessitates that the piston 15 be at the outermost limit of its stroke when the piston 16 is at the innermost limit of its stroke and that the annulus 11 previously described take the form of a solid partition 68. In this latter modification a single, three-throw crankshaft 69 is employed, said shaft preferably being journaled for rotation at one end of the cylinder, either in bearings directly carried by said cylinder or in independently supported bearings. Spaced, parallel connecting rods 70 directly connect the collar 56 of the piston 16 with the outer alined throws of the shaft 69 to the end of applying the rectilinear motion of the interconnected pistons 15 and 16 to said shaft and rotating the latter. The connecting rods of the pistons 19 and 20 are similar to the rods 21a and 22a previously described and extend from said pistons axially through the open ends of the pistons 15 and 16 to support spaced, parallel cross-arms 60a and 61a preferably lying in a plane perpendicular to the axis of the shaft 69, corresponding ends of the arms 60a and 61a being directly interconnected by means of pull-rods 71 disposed on opposite sides of the cylinder, the yoke thus formed to interconnect the pistons 19 and 20 for simultaneous actuation being operatively connected with the center throw of the shaft 69 by means of a connecting rod 72. Any suitable means, such as slide bearings 65a, may be provided to position and guide the pull-rods 67 and 71 relative to the cylinder, and, as above set forth, any suitable arrangement of fuel ports, manifolds and igniting devices may be applied to this latter modification, it being apparent that the piston 16 enters its power stroke simultaneously with the piston 19 when the two-cycle principle is employed and that successive power strokes by the pistons 15 and 16 are followed by successive power strokes by the pistons 19 and 20 when the four-cycle principle is employed.

The modifications of the invention shown and described do not exhaust the possible combinations to be had with cylinder and piston arrangements of the character set forth, hence I wish to be understood as including in my invention any such combinations as properly fall within the scope of the appended claims in addition to the forms specifically shown and described.

I claim as my invention—

1. An internal-combustion engine of the character described comprising in operative combination an open-ended cylinder, crankshafts journaled for rotation adjacent each end of said cylinder, opposed, hollow pistons within said cylinder and connected with said crankshafts and a supplementary piston within each of said hollow pistons operatively connected with its adjacent crankshaft and operable in opposition to its respective piston.

2. An internal-combustion engine of the character described comprising in operative combination an open-ended cylinder, crankshafts journaled for rotation adjacent each end of said cylinder, opposed, hollow, double-acting pistons within said cylinder and connected with said crankshafts, single-acting pistons connected with said crankshafts within and in opposition to said double-acting pistons, and means for synchronizing the rotation of said crankshafts.

3. An internal-combustion engine of the character described comprising in operative combination an open-ended cylinder, hollow, double-acting pistons in opposed relation in said cylinder, single-acting pistons within and in opposed relation with said double-acting pistons and crank means operatively connected with said pistons for translating the rectilinear motion of said pistons into rotary motion.

4. An internal-combustion engine of the character described comprising in operative combination a straight, open-ended cylinder, rotatable crank means, double-acting pistons in opposed relation within said cylinder, single-acting pistons within and in opposed relation with said double-acting pistons and connections between said crank means and pistons whereby the motion of each of said single-acting pistons is synchronized with the motion of the relatively remote double-acting piston.

5. An internal-combustion engine of the character described comprising a straight, open-ended cylinder, a mutliple-throw crankshaft journaled for rotation adjacent one end of said cylinder, alternate throws of said crankshaft having their pins in axial alinement and adjacent throws of said crankshaft being offset one hundred and eighty degrees from each other, double-acting, hollow pistons in opposed relation in said cylinder, single-acting pistons within and in opposed relation with said double-acting pistons and rods operatively connecting each double-acting piston and its relatively remote single-acting piston with alined throws of said crankshaft.

6. In an internal-combustion engine, a straight, open-ended cylinder, a multiple-throw crankshaft journaled for rotation in operative relation with said cylinder, double-acting, hollow pistons in opposed relation within said cylinder, single-acting pistons within and in opposed relation with said double-acting pistons and connections between said pistons and the throws of said crankshaft whereby the motion of each single-acting piston is caused to correspond in amplitude and direction with the motion of its relatively remote double-acting piston.

7. In an internal-combustion engine, a straight, open-ended cylinder, a multiple-throw crankshaft journaled for rotation intermediate the ends of said cylinder, double-acting, hollow pistons in opposed relation within said cylinder, operative connections between said double-acting pistons and opposed throws of said crankshaft, single-acting pistons within and in opposed relation with said double-acting pistons and connections between each said single-acting piston and its relatively remote double-acting piston whereby the motion of each single-acting piston is caused to correspond in amplitude and direction with the motion of its relatively remote double-acting piston.

Signed at Denver, in the county of Denver and State of Colorado, this 12th day of April, 1929.

GEORGE D. HIGMAN.